United States Patent [19]
Payne

[11] 3,912,030
[45] Oct. 14, 1975

[54] SNOWMOBILE SKI MOUNTING ARRANGEMENT

[75] Inventor: Guy D. Payne, Menomonee Falls, Wis.

[73] Assignee: Outboard Marine Corporation, Waukegan, Ill.

[22] Filed: Sept. 10, 1973

[21] Appl. No.: 396,014

[52] U.S. Cl. ............................. 180/5 R; 280/961
[51] Int. Cl.² .............................. B62M 27/00
[58] Field of Search........... 180/5 R; 280/96.3, 96.1, 280/124 A

[56] References Cited
UNITED STATES PATENTS

| | | | |
|---|---|---|---|
| 2,220,254 | 11/1940 | Maier | 280/96.2 R |
| 3,140,099 | 7/1964 | Feu | 280/16 |
| 3,213,955 | 10/1965 | Hetteen | 180/5 R |
| 3,530,950 | 9/1970 | Lamb | 180/5 R |
| 3,550,706 | 12/1970 | Watkins | 180/5 R |
| 3,550,707 | 12/1970 | Lang | 180/5 R |
| 3,583,507 | 6/1971 | Trautwein | 180/5 R |
| 3,596,726 | 8/1971 | Takada | 180/5 R |
| 3,608,658 | 9/1971 | Woodfill | 180/5 R |
| 3,692,130 | 9/1972 | Stacy | 180/5 R |
| 3,727,940 | 4/1973 | Hug | 280/124 A |
| 3,734,219 | 5/1973 | Christensen | 180/5 R |

FOREIGN PATENTS OR APPLICATIONS 986,197   3/1951   France ................. 180/5 R

*Primary Examiner*—Philip Goodman
*Assistant Examiner*—John A. Carroll
*Attorney, Agent, or Firm*—Michael, Best & Friedrich

[57] ABSTRACT

Disclosed herein is a snowmobile including a chassis, a pair of skis each having a ground-engaging surface with a fore and aft centerline, and separate means connecting each of the skis to the chassis for support of the chassis and for permitting turning of the skis relative to the chassis, each of the means connecting the skis to the chassis including a member mounted for rotation relative to the chassis with a rotary axis approximately intersecting the fore and aft centerline of the ground-engaging ski surface.

2 Claims, 3 Drawing Figures

SNOWMOBILE SKI MOUNTING ARRANGEMENT

BACKGROUND OF THE INVENTION

The invention relates generally to snowmobiles. More particularly, the invention relates to mounting arrangements for snowmobile skis.

Prior arrangement for connecting a ski to a snowmobile chassis for support of the chassis and for turning of the ski relative to the chassis are disclosed in the Hetteen U.S. Pat. No. 3,613,812 issued Oct. 19, 1971, and in the Watkins U.S. Pat. No. 3,550,706 issued Dec. 29, 1970.

In prior snowmobile ski mounting arrangements, as shown schematically in FIG. 3, the steering axis 101 of the ski steering column 103 was commonly arranged so as to intersect the snow or ground-engaging surface 105 of the ski 107 at a point "A" spaced a distance "B" from the fore and aft centerline 109 of the snow or ground-engaging ski surface 105. As a consequence, the friction force occurring between the ski and the snow during movement of the snowmobile, and acting generally along the fore and aft centerline 109 could produce a turning movement about the steering axis 101 which can have an adverse effect on snowmobile steering control.

SUMMARY OF THE INVENTION

The invention provides a snowmobile ski mounting arrangement in which the rotary axis of the ski steering column intersects the fore and aft centerline of the snow-engaging surface of the ski to reduce or avoid turning action of the ski caused by friction between the ski and the snow during snowmobile movement.

More particularly, the invention provides a snowmobile including a chassis, a pair of skis each having a ground or snow-engaging surface with a fore and aft centerline, and separate means connecting each of the skis to the chassis for support of the chassis and for permitting turning of the skis relative to the chassis, each of the means connecting the ski to the chassis including a member mounted for rotation relative to the chassis with the rotary axis approximately intersecting the fore and aft centerline of the ground-engaging ski surface.

Still further in accordance with the invention, each of the ski mounting means further includes a leaf spring connected adjacent its ends to the associated one of the skis and a mounting bracket movably connected to the leaf spring intermediate the ends thereof for rotation relative to the spring about a horizontal axis transverse to the centerline and fixed to the steering column in offset relation to the rotary axis thereof and for common rotation with the column.

The principal feature of the invention is a snowmobile ski mounting arrangement which serves to reduce the possibility of unwanted ski turning action caused by friction between the ski and the snow acting on a moment arm.

Other features and advantages of the invention will become known by reference to the following drawings, general description, and claims.

DRAWINGS

Before explaining the invention in detail, it is to be understood that the invention is not limited in its application to the details of construction and arrangement of parts set forth in the following general description or illustrated in the accompanying drawings, since the invention is capable of other embodiments and of being practiced or carried out in various ways. Also it is to be understood that the phraseology or terminology employed herein is for the purpose of description and not of limitation.

GENERAL DESCRIPTION

Figure 1:
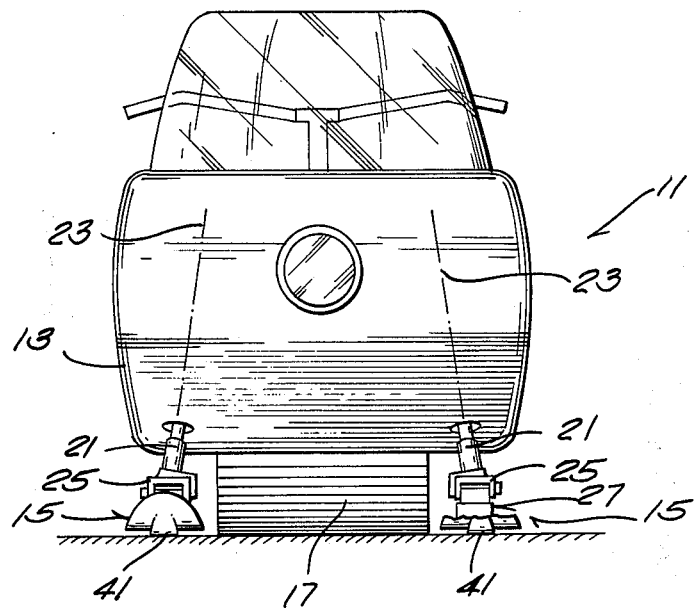
FIG. 1 is a front view, with parts broken away, of a snowmobile incorporating various of the features of the invention.

Shown in FIG. 1 is a snowmobile 11 which is generally of conventional construction except for the ski mounting arrangement. More particularly, the snowmobile 11 includes a frame or chassis 13 which is supported, at the front, by a pair of laterally spaced skis 15, and which is supported, at the rear, by an endless track 17. The skis 15 are mounted to support the chassis 13 and for steering movement relative to the chassis 13 by respective steering members or columns 21 which are rotatably supported by the chassis 13 in any suitable manner with respective rotary axes 23 which extend, when seen from in front, in downwardly and outwardly diverging relation to each other.

Fixed to the steering columns 21 for common movement about the steering axes 23 are respective brackets 25 which, in turn, are connected to respective leaf spring assemblies 27 intermediate the ends of such assemblies. In turn, the respective leaf spring assemblies 27 are connected adjacent their ends to the respective skis 15.

Figure 2:
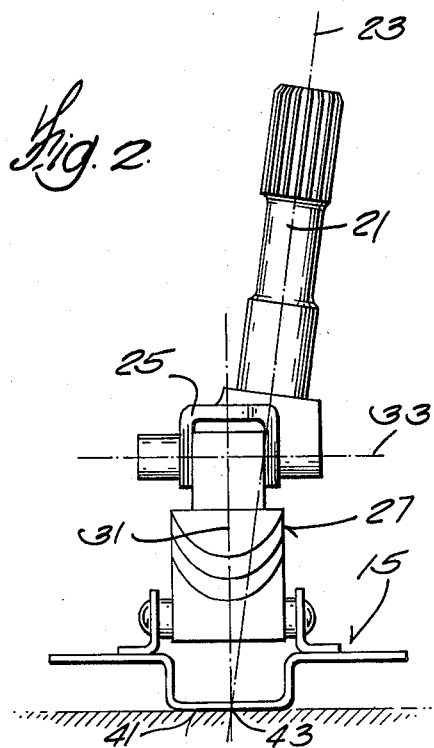
FIG. 2 is an exploded schematic view with parts omitted of a snowmobile ski mounting arrangement which is in accordance with the invention and which is included in the snowmobile shown in FIG. 1.
Figure 3:
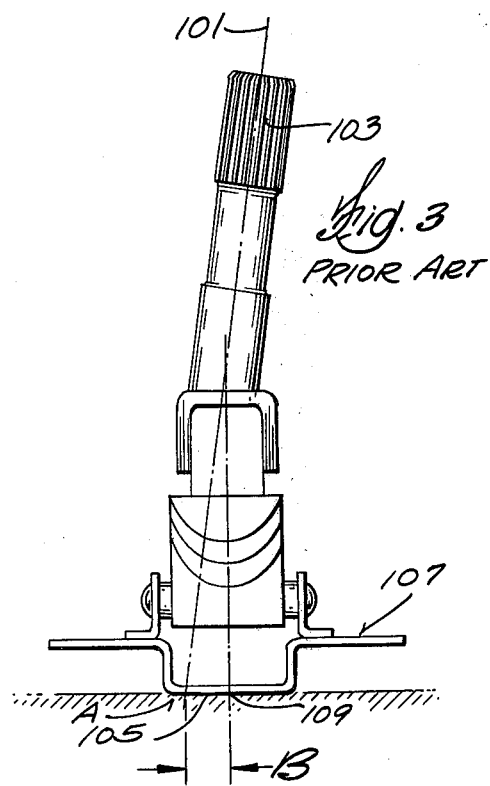
FIG. 3 is a schematic view similar to FIG. 2 illustrating the prior art.

In general, the skis 15 and the associated leaf spring assemblies 27 and mounting brackets 25 extend respectively in common fore and aft vertical planes indicated by the numeral 31 in FIG. 2. In addition, the connections of the mounting brackets 25 to the leaf spring assemblies 27 afford relative rotation therebetween about generally horizontal axes 33 extending transversely to the length of the skis 15. In addition, the attachment of the leaf spring assemblies 27 to the skis 15 preferably permits relative movement therebetween. The foregoing description is meant to typically describe prior snowmobile ski mounting arrangements and the invention is not limited to the specific structure disclosed.

In accordance with the invention, the mounting brackets 25 are constructed and attached to the steering columns 21 such that the respective steering column rotary axes 23 intersect the ground-engaging surfaces 41 of the skis 15 approximately at the longitudinal or fore and aft ski centerlines 43. In this regard, the mounting brackets 25 fixedly extend from the steering column axes 23 in offset or eccentric relation therefrom as shown in the drawings. Expressed in other terms, the steering column axes 23 pass through or by the mounting brackets 25 in spaced relation to the common plane 31 containing the associated ski 15 and leaf spring assembly 27.

In operation, the friction force encountered by the ski 15 bearing against the snow acts generally along the centerline 43 of the ground-engaging ski surface 41 and intersects the steering axis 23, thereby avoiding unwanted ski turning action which can occur when the steering axis passes in spaced relation to the fore and aft centerline of the ground-engaging ski surface.

Various aspects of the invention are set forth in the following claims.

What is claimed is:

1. A snowmobile including a chassis, a pair of skis each having a ground-engaging surface with a fore and aft centerline, and separate means connecting each of said skis to said chassis for support of said chassis and for permitting turning of said skis relative to said chassis about respective axes which diverge downwardly when seen from in front and which respectively approximately intersect the fore and aft centerline of said ground-engaging ski surfaces, each of said mounting means including a member mounted for rotation relative to said chassis about one of said axes and including a lower end, a leaf spring connected adjacent its ends to the associated one of said skis, and a mounting bracket movably connected to said leaf spring intermediate the ends thereof for rotation relative to said spring about a horizontal axis transverse to said centerline and fixed to said lower end of said column in offset relation to said rotary axis and against relative movement between said bracket and said member.

2. A snowmobile including a chassis, a pair of skis each having a ground-engaging surface with a fore and aft centerline, and separate means connecting each of said skis to said chassis for support of said chassis and for permitting turning of said skis relative to said chassis about respective steering axes which diverge downwardly and outwardly relative to each other when seen from in front, each of said means connecting said skis to said chassis including a member having a lower end and mounted for rotation relative to said chassis with the rotary axis thereof constituting one of said steering axes and approximately intersecting the fore and aft centerline of said ground-engaging surface of the connected one of said skis, each of said connecting means also including a mounting bracket movably connected to the associated one of said skis for swinging movement of said one ski relative to said mounting bracket about a horizontal axis transverse to said centerline and fixed to said member lower end in offset relation to said rotary axis and against relative movement between said bracket and said member.

* * * * *

PO-1050
(5/69)

UNITED STATES PATENT OFFICE
CERTIFICATE OF CORRECTION

Patent No. 3,912,030          Dated October 14, 1975

Inventor(s) Guy D. Payne

It is certified that error appears in the above-identified patent and that said Letters Patent are hereby corrected as shown below:

Column 3, line 15          delete "mounting", insert ---connecting---

Column 3, line 23          delete "column", insert ---member---.

Signed and Sealed this

Nineteenth Day of April 1977

[SEAL]

Attest:

RUTH C. MASON
*Attesting Officer*

C. MARSHALL DANN
*Commissioner of Patents and Trademarks*